United States Patent [19]

Swinford

[11] Patent Number: 5,080,594

[45] Date of Patent: Jan. 14, 1992

[54] PIGTAIL CONNECTOR WITH LIGHT

[76] Inventor: Stephen W. Swinford, 845 Bleich Rd., Paducah, Ky. 42003

[21] Appl. No.: 578,590

[22] Filed: Sep. 4, 1990

[51] Int. Cl.⁵ .............................................. H01R 33/74
[52] U.S. Cl. ........................................ 439/35; 280/420
[58] Field of Search .................................... 439/34-36, 439/192, 194, 490; 280/420-423

[56] References Cited

U.S. PATENT DOCUMENTS 3,836,843  9/1974  Yonce .
3,924,914  12/1975  Banner .
4,092,034  5/1978  Becker .......................... 439/36 X
4,101,190  7/1978  Schoff .
4,671,597  6/1987  Grill .

Primary Examiner—Eugene F. Desmond
Attorney, Agent, or Firm—King and Schickli

[57] ABSTRACT

A pigtail connector for transferring electrical power between electrical systems of a tractor and trailer includes a housing and an integral light source. The light source is wired to terminals of opposite polarity in the housing. The light source may be activated by engaging the marker lights on the tractor/trailer and provides a safety light directed over the deck plate area at the rear of the tractor. A removable lens focuses the light into a beam directed longitudinally over the connector so as to illuminate the connection area.

4 Claims, 1 Drawing Sheet

PIGTAIL CONNECTOR WITH LIGHT

TECHNICAL FIELD

This invention relates to a connector for hooking electrical systems between a tractor and trailer. More particularly, a pigtail connector is provided including an integral light source for illuminating the deck plate area on the rear of a tractor.

BACKGROUND OF THE INVENTION

A significant portion of the equipment, goods and merchandise shipped in this country are transported by tractor trailer rigs. Often due to shipping schedules and deadlines or in an effort to avoid peak traffic hours, shipping by tractor trailer is completed during hours of darkness. In fact, in recent years night time shipping activity has become more and more common.

Many of the larger trucking companies have terminal operations including classifying yards, dock facilities, management offices and storage sheds. Upon arriving at a terminal, a tractor is typically operated to position the connected trailer at a specific bay or dock. The tractor may then be disconnected from that trailer and reconnected to another trailer at a different dock or bay prior to continuing its journey.

Each time a tractor and trailer are connected/disconnected, a number of operations are required. More specifically, besides the mechanical connection between the tractor and trailer there is an electrical connection through a flexible electrical cable providing power from the tractor to the running lights and tail lights of the trailer. There are also air glad hands for connecting the operating systems of the tractor and trailer. This connection allows, for example, the operator of the tractor to apply the tractor brakes and trailer brakes together as required during driving.

While terminal areas are typically well lighted, it must be appreciated that visibility in the deck plate area at the rear of the tractor where these connections are completed is quite limited during hours of darkness. This is because despite the overhead lighting shadows are typically cast by the tractor and trailer over the deck plate. The shadows reduce visibility making it difficult to connect and disconnect the control lines between the tractor and trailer. Additionally, it should be appreciated that the reduced visibility significantly increases the risk that individuals working in the deck area may trip over an unseen object in the shadows and fall resulting in a substantial injury.

In order to address this problem, many individuals utilize battery powered flash lights to illuminate the work area. While quite effective for this purpose, it must be appreciated that this approach suffers a number of drawbacks. More particularly, the batteries in the flash lights run down after extended use and replacement batteries are not always readily available. It should also be appreciated that a flash light may be misplaced and hence it is not always available when needed. Further, it should be appreciated that the flash light is typically manipulated in one hand. Accordingly, the individual has only one free hand to be used to maintain his or her balance and/or manipulate tools and/or control lines. As such, it should be appreciated that flash light utilization suffers from a number of significant drawbacks.

A need, therefore, exists for a method and/or apparatus addressing these problems. Preferably, a light should be provided in the deck plate area of a tractor that is adapted to illuminate the area to allow the necessary work to be completed in a safe and efficient manner when connecting/disconnecting the tractor from a trailer. The light should be an integral part of the tractor so as to always be available when needed. The light should also be versatile so that the operator can direct it as required to complete any appropriate operations including, for example, maintenance to the breaker box of a trailer. These ends may be achieved by mounting a light source on the pigtail connector of the tractor that feeds electrical power to the trailer.

SUMMARY OF THE INVENTION

Accordingly, it is a primary object of the present invention to provide an apparatus and method for illuminating a deck plate of a tractor overcoming the above-described limitations and disadvantages of the prior art.

It is another object of the present invention to provide a light source as an integral component of the body of a pigtail connector used for transferring electrical power between a tractor and trailer. Hence, the light is conveniently located and available where needed at all times.

Still another object of the present invention is to provide a light source activated only when needed by manipulation of a control switch in the tractor.

Yet another object of the present invention is to provide an integral pigtail connector and light source with a lens and/or reflector to focus the light into a beam that is directed toward the end of the connector to enhance visibility and aid in connecting the pigtail connector to the cooperating connector on a trailer.

A further object of the invention is to provide an inexpensive and convenient method of illuminating the deck plate area of a tractor so as to provide improved visibility during hours of darkness that aids an operator in efficiently connecting/disconnecting tractor and trailer systems as required during trailer changes.

Still another object of the present invention is to provide an integral pigtail connector and light source at the end of a flexible cable so that the light source may utilized as an emergency light in various positions about the tractor and trailer.

Yet another object of the present invention is to provide a pigtail connector with an integral light source that is adapted to be a cost efficient replacement for installation on existing equipment.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a pigtail connector for transferring electrical power between a tractor and trailer is provided. The pigtail connector is attached to the distal end of a flexible electrical cable adapted for carrying power to the running lights and tail lights of the trailer. The pigtail connector includes a housing cast from aluminium or molded in plastic.

An outlet is held in the housing. As is known in the art, the outlet includes a plurality of sockets for conducting electrical power from the tractor to an attached trailer. This is done through connection with a mating connector and electrical feed line carried by the trailer.

A light source is integrally mounted in the housing of the pigtail connector. This light source is wired to two terminals of opposite polarity contained within the housing to provide electrical current for operation. Preferably, the light source is wired to the marker light terminals so as to be powered when the marker light switch in the tractor cab is activated. Alternatively, however, it should be appreciated that the light source may be wired to other terminals which are responsive to a separate switch allowing independent control.

A focusing lens cooperates with the light source to form and direct a beam of light over the outlet. This illuminates the outlet area to allow better visibility at night for easy connection with the mating trailer connector. Generally, such illumination also provides light over the entire deck plate area between the tractor and trailer. This results in improved visibility which directly translates into a safer work environment wherein tasks may be completed more efficiently.

As indicated above, it must also be remembered that the electrical cable to which the pigtail connector is attached is flexible. Thus, the light source may be conveniently positioned as desired to provide an emergency utility light in various positions about the tractor and trailer. This is done simply by detaching the pigtail connector from the cooperating trailer connector and stretching it to the desired areas.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the Drawing.

Reference will now be made in detail to the present preferred embodiment of the invention, an example of which is illustrated in the accompanying drawing.

DETAILED DESCRIPTION OF THE INVENTION

Figure 1:
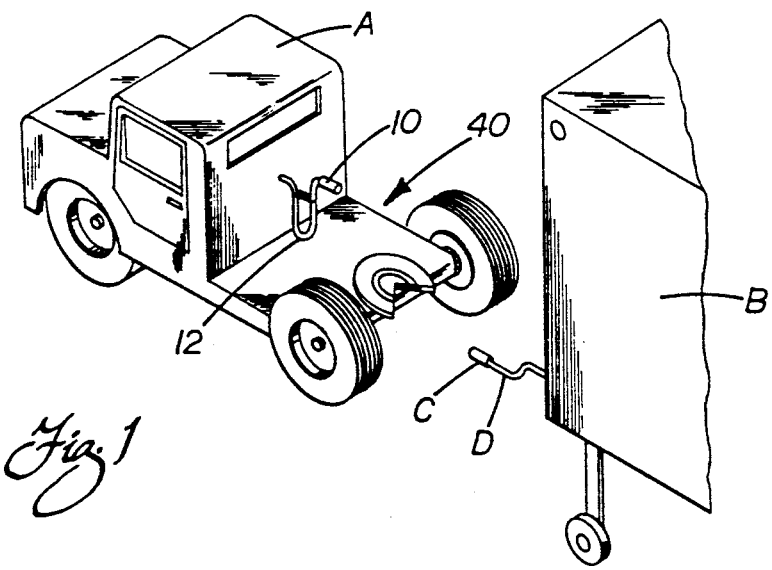
FIG. 1 is a perspective view of the rear of a tractor equipped with the pigtail connector of the present invention and a fragmentary view of the trailer to which the tractor may be operatively connected.

Reference is now made to drawing FIG. 1 showing a tractor A equipped with the pigtail connector 10 of the present invention. As shown, the pigtail connector 10 is received on the distal end of a flexible electrical cable 12. The cable 12 includes a series of individual, insulated conductors for carrying electrical power from the tractor A to the various running lights and tail lights (not shown) carried on the trailer B to be connected to and pulled by the tractor. To achieve this end, the connector 10 is attached to a mating or cooperating connector C carried at the distal end of an electrical feed line D on the trailer B.

Figure 2:
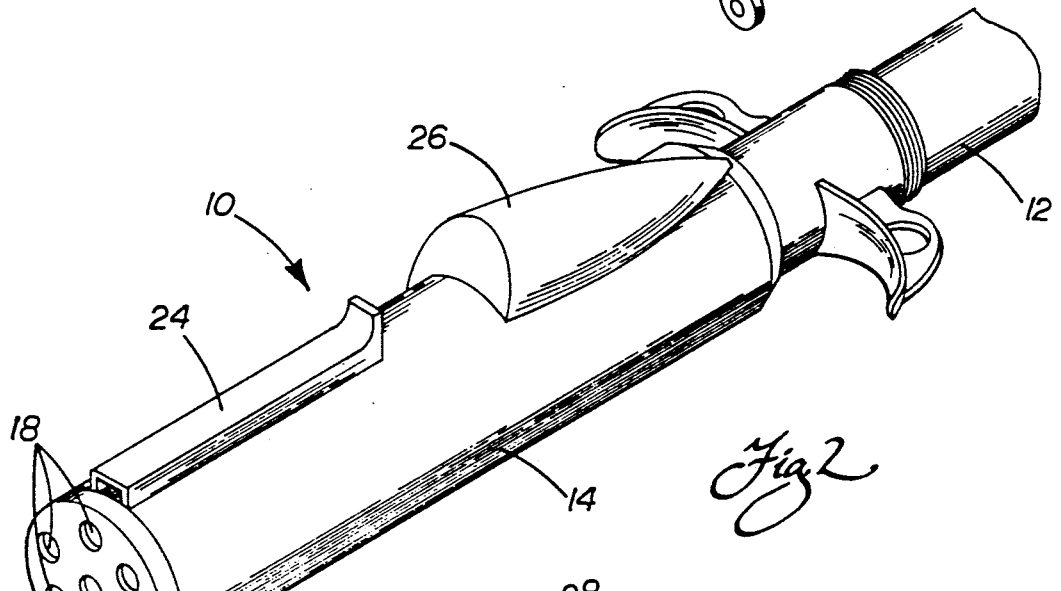
FIG. 2 is a perspective view of the pigtail connector and integral light source of the present invention.
Figure 3:
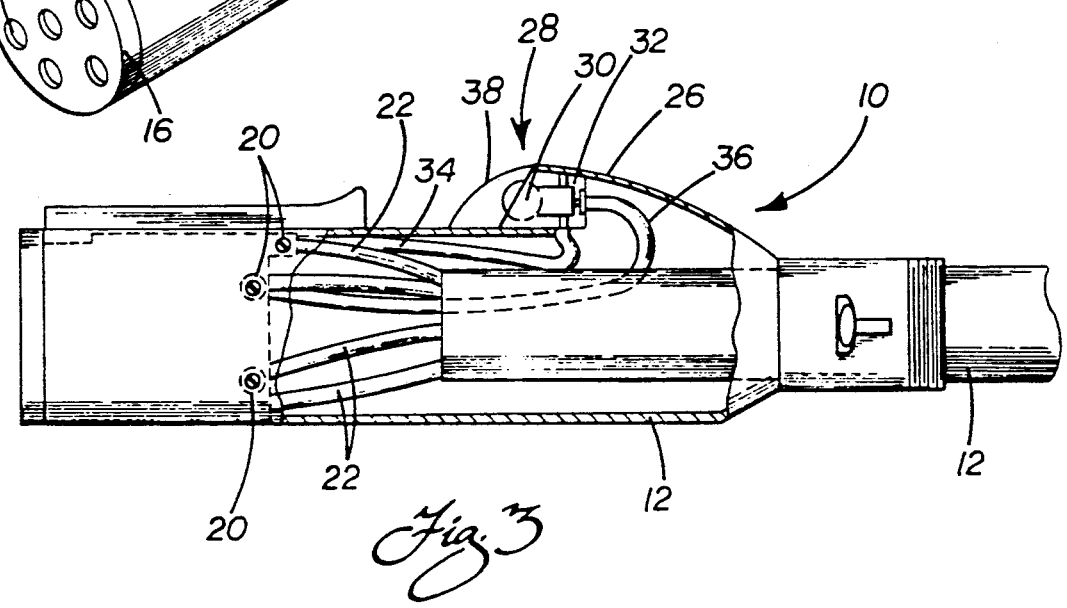
FIG. 3 is a detailed partially cut-away side elevational view of the pigtail connector of FIG. 2.

As best shown in FIGS. 2 and 3, the connector, generally designated by reference numeral 10, includes a housing 14. The housing 14 may be formed from die cast aluminium. Preferably, however, it is formed from electrically non-conductive material. Preferably, the housing 14 is molded from plastic such as ABS or polycarbonate.

An outlet 16 is held in the housing 14. As shown, the outlet 16 includes a series of spaced sockets 18. Each socket 18 includes a terminal 20 to which an individual electrical conductor 22 from the cable 12 is connected as is known in the art (see also FIG. 3). Each of the sockets 18 is adapted to receive a cooperating pin conductor (not shown) on the mating connector C attached to the trailer B. A guide retainer 24 formed on the housing 14 is received in a cooperating slot on the mating connector C to insure that the pins and sockets 18 are properly aligned to provide the desired electrical connection for control of the running lights and tail lights of the trailer in a manner well known in the art.

In accordance with an important aspect of the invention, the housing 14 is formed so as to include a space or compartment 26 for receiving a light source 28. As shown in FIG. 3, the light source 28 includes a light bulb 30 received in a socket 32. The light bulb 30 receives electrical power by connection of conductors 34, 36 to terminals 20 of opposite polarity. For example, the terminals 20 selected may be those that control the marker lights of the trailer B. In this way, the light source 28 may be activated with the marker lights by operation of an appropriate switch in the cab of the tractor A. Further, this connection allows the pigtail connector 10 of the present invention with the integral light source 28 to be retrofit in place of connectors on existing equipment. Thus the potential market for the present invention is significantly enhanced. Additionally, current tractor owners benefit as the device of the present invention may be added to their equipment with a minimum of expense. Alternatively, however, it should be recognized that the light source 28 could be connected to other terminals for actuation with other trailer lights or independently through a separate switch, if desired.

As shown, light from the bulb 30 is directed through a lens 38. The lens 38 is designed to focus the light into a beam for projection along a longitudinal axis of the housing 14. Accordingly, the beam of light is directed over the guide retainer 24 and outlet 18 thereby providing the necessary illumination to increase visibility in darkness and aid in connection of the connector 10 to the mating connector C of the trailer B. Of course, the lens 38 may be removed from the housing 14 to allow replacement of the bulb 30 when necessary.

It should also be appreciated that the light source 28 is conveniently located so as to be always available to light the deck plate area 40 on the rear of the tractor A (see FIG. 1). Accordingly, the visibility in the deck plate area 40 is significantly increased during hours of darkness. As a result the light source 28 very effectively aids in connecting/disconnecting the various control systems between the tractor A and trailer B including not only the connectors 10,C but also the air glad hands. Further, since the light source 28 is an integral part of the connector 10 on the distal end of the flexible cable 12, it should be appreciated that it may be used very effectively as a utility light that may be disconnected from the connector C and conveniently positioned around the tractor A and trailer B as required to illuminate a work area during maintenance operations.

In summary, numerous benefits result from employing the concepts of the present invention. Advantageously, the present apparatus and method of lighting the deck plate area 40 of a tractor A significantly increases visibility during the hours of darkness. Accordingly, operator safety when completing routine operations as required, for example, when connecting/disconnecting a tractor and a trailer is significantly increased. The integral light source 28 also effectively eliminates the need for separate load lights which are a relatively expensive option on new equipment that also require their own control switch and circuit. Further, since the light source 28 is integral with the connector 10, it may be manipulated on the end of the flexible cable 12 and stretched to a desired area to provide a utility light when completing maintenance or repair operations. Additionally, since the light source 28 is powered by the electrical system of the tractor, it provides significantly increased lighting power over a longer period of time than that available from standard flash lights as now commonly used by tractor/trailer operators.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a reflector may be provided instead of or in addition to the lens 38 to focus the light into a beam. Additionally, a separate control switch may be provided on the housing of the pigtail connector to control operation of the integral light source. The embodiment was chosen and described to provide the best illustration of the principles of the invention and its practical application to thereby enable one of ordinary skill in the art to utilize the invention in various embodiments and with various modifications as are suited to the particular use contemplated. All such modifications or variations are within the scope of the invention as determined by the appended claims when interpreted in accordance with breadth to which they are fairly, legally and equitably entitled.

I claim:

1. A pigtail connector for transferring electrical power between electrical lines in a flexible cable of a tractor and a trailer, comprising:
   a connector housing mounted to a freely positionable distal end of said flexible cable;
   an outlet means received in said housing and including terminal means of opposite polarity for conducting electrical power from a tractor to a trailer;
   a light source received in said housing and connected to said terminal means of opposite polarity so as to receive electrical power, said light source being directable to allow illumination of selected areas of said tractor and trailer; and
   means cooperating with said light source for focusing light emitted by said source.

2. The pigtail connector as set forth in claim 1, wherein said light source and focusing means are oriented about a longitudinal axis of said housing so as to direct light over said outlet means so that said outlet means is illuminated to allow visibility in darkness for easy connection.

3. The pigtail connector as set forth in claim 1, wherein said focusing means is a lens removably attached to said housing so as to allow replacement of said light source.

4. A pigtail connector for transferring electrical power between electrical lines in a flexible cable of a tractor and a trailer, comprising:
   a connector housing mounted to a freely positionable distal end of said flexible cable;
   an outlet means received in said housing and including terminal means of opposite polarity for conducting electrical power from a tractor to a trailer, and
   a light source received in said housing and connected to said terminal means of opposite polarity so as to receive electrical power, said light source being directable to allow illumination of selected areas of said tractor and trailer.

* * * * *